Dec. 17, 1935.  A. P. DIESCHER  2,024,514
METHOD AND APPARATUS FOR MAKING TUBES
Filed March 25, 1933  6 Sheets-Sheet 2

FIG. 1a.

INVENTOR
August P. Diescher
BY
Brown, Critchlow & Flick
ATTORNEYS

Dec. 17, 1935.  A. P. DIESCHER  2,024,514
METHOD AND APPARATUS FOR MAKING TUBES
Filed March 25, 1933  6 Sheets-Sheet 3

INVENTOR
August P. Diescher
BY
Brown, Critchlow & Flick
ATTORNEYS

Patented Dec. 17, 1935

2,024,514

UNITED STATES PATENT OFFICE 2,024,514

METHOD AND APPARATUS FOR MAKING TUBES

August P. Diescher, Pittsburgh, Pa., assignor to Diescher Tube Mills, Inc., Pittsburgh, Pa., a corporation of Delaware Application March 25, 1933, Serial No. 662,659

27 Claims. (Cl. 80—62)

My invention pertains to apparatus for, and methods of, making tubes by the process of piercing a billet by cross-rolling, and then elongating, by cross-rolling upon a mandrel, the tubular blank thus obtained.

The terms "cross-rolling" and "cross-rolls" as herein employed, include any operation in which the work-piece is subjected to the pressure treatment of helically acting members for the purposes named, and any helically acting members capable of effecting such pressure treatment.

It is the principal object of my invention to provide a method of practicing the said process, and an apparatus for carrying the same into effect, by means of which an especially high production speed can be obtained. Other objects of my invention, and advantages which it secures, will appear from the following specification and claims.

By way of example, a form of tube-making apparatus embodying my invention, and adapted for practicing my improved method, is shown in the accompanying drawings and described in the following specification. I wish it understood, however, that the invention may be embodied in other forms, and that changes may be made in the apparatus described and shown, without exceeding the scope of the invention as defined in the appended claims.

In the manner of practicing my improved method, and the apparatus therefor, herein described and illustrated, mandrels having a pointed end, or provided with a detachable point, as desired, are employed in piercing which are long enough for use in the subsequent operation of elongating the pierced billets. These mandrels are fed one by one from a storage rack to the receiving table of a cross-roll piercing mill. When a mandrel thus arrives upon the receiving table, a carriage provided with means for resisting the thrust imparted to the mandrel during piercing, is brought up into engagement with the trailing end of the mandrel and then pushes the latter forward until its point is in the required piercing position with respect to the cross-rolls of the piercing mill. Thereupon a billet is entered into the mill from the opposite side thereof, is pierced, and emerges from the cross-rolls as a tubular blank telescoped on the mandrel. The term "tubular blank" or "blank" as used herein is intended to refer to the work-piece after a billet has been pierced and during the intermediate stages of its progress through the apparatus until it becomes a completed tube.

The tubular blank and enclosed mandrel are then withdrawn lengthwise until their leading ends are free of the mill, the carriage being also disconnected from the trailing end of the mandrel, so that they occupy a position in which their transfer away from the receiving table is unimpeded. Then the blank and enclosed mandrel are together transferred to the feed table of a cross-roll elongating mill. The blank and mandrel are then fed into the elongating mill and emerge therefrom in the form of a relatively long and thin-walled seamless tube, with the mandrel enclosed therein. Thereafter the mandrel is extracted from the tube and is returned to the storage rack, ready for feeding again to the receiving table of the piercing mill.

Figures 1, 21:
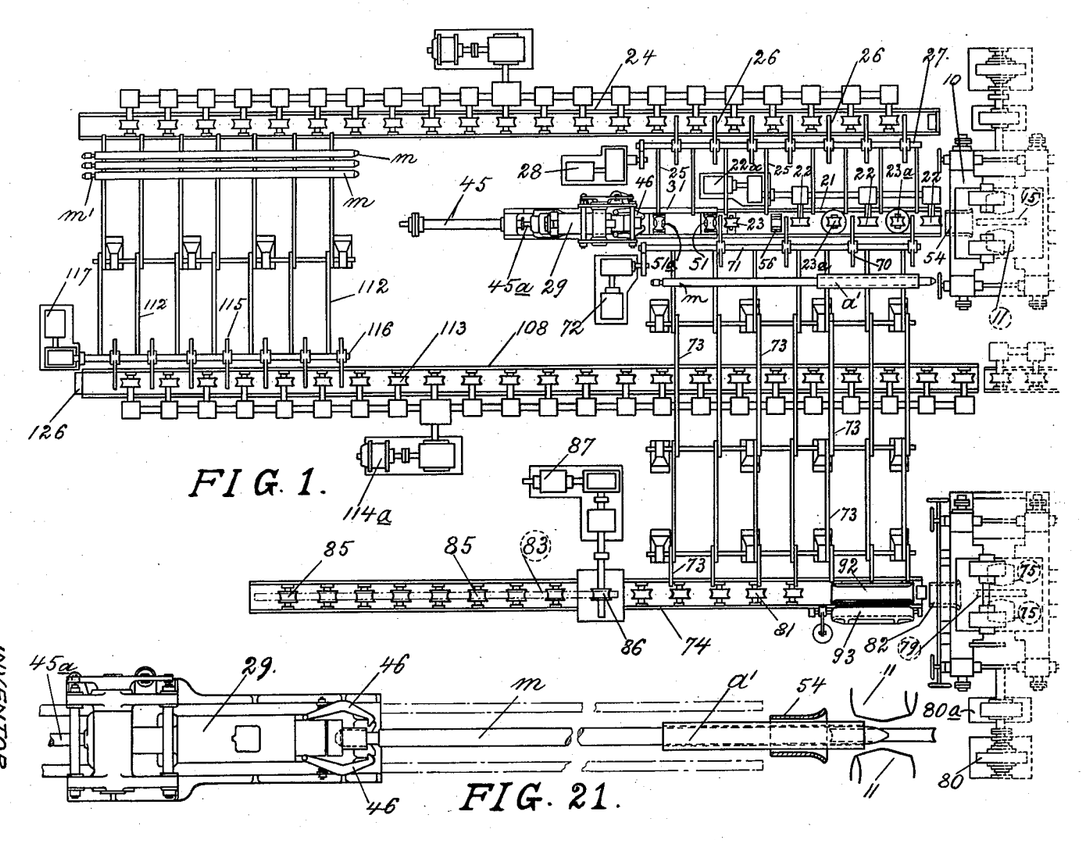
Figs. 1 and 1a together constitute a plan of the apparatus, the parts being shown in the position in which a mandrel (not shown) is about to be brought forward to the position in the cross-rolls where piercing takes place, preparatory to the feeding of a billet into the cross rolls.
Fig. 21 is a schematic plan showing the position of the mandrel, mandrel carriage, and pierced billet just after a piercing operation has been completed.
Figure 1A:
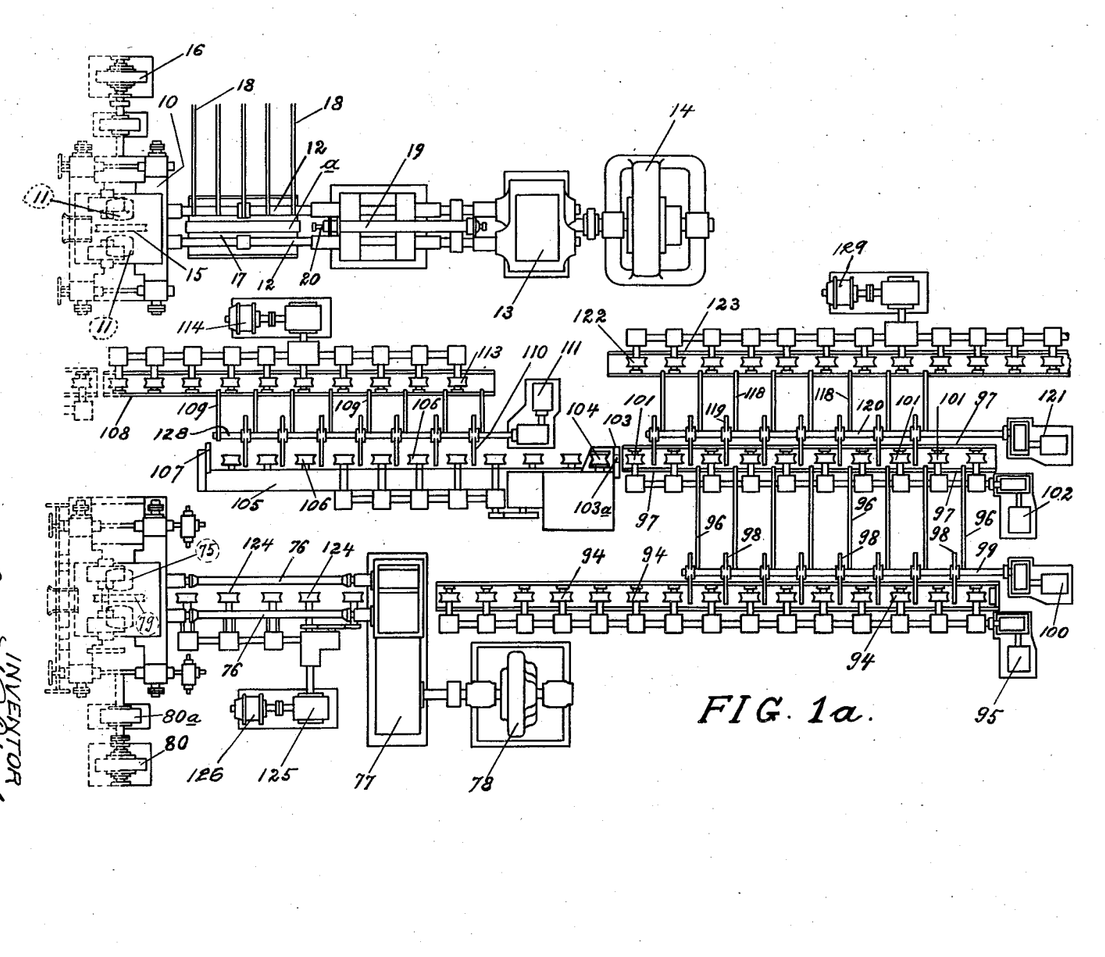
Figures 2, 3:
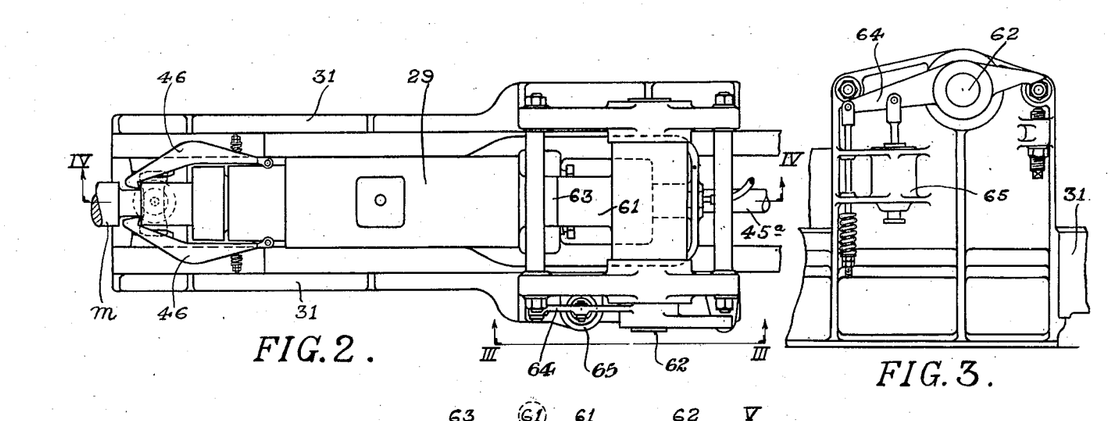
Fig. 2 is an enlarged plan of the mandrel carriage and portions of the track frame adjacent thereto, the carriage being in the position it assumes when the mandrel is in piercing position.
Fig. 3 is a side view of the portion of the track frame on which is mounted the carriage-retaining latch, the view being drawn as seen from the line III—III of Fig. 2.
Figure 4:
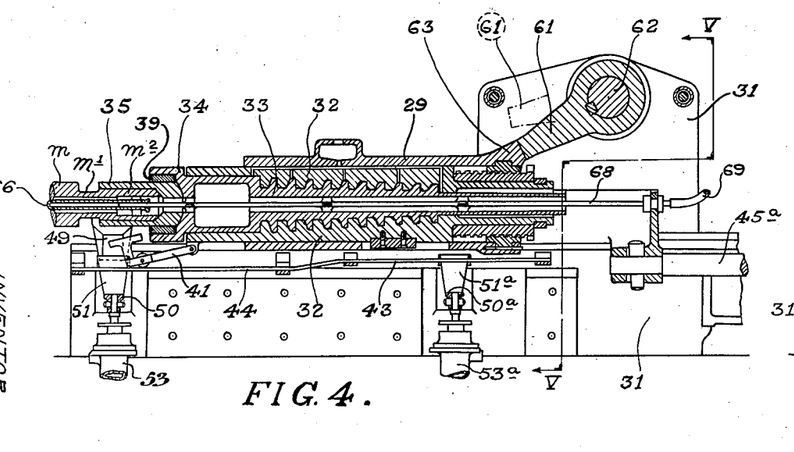
Fig. 4 is a longitudinal section taken on the line IV—IV of Fig. 2.

Referring now to the drawings and particularly to Figs. 1 and 1a thereof, 10 designates a piercing mill, which may be of any suitable type, for instance that disclosed by Patent No. 1,586,975, issued June 1, 1926, to Samuel E. Diescher. Such a mill as the last-named would include cross-rolls 11 driven through shafts 12 and gearing 13, from a motor 14, and a guide disc 15 driven, either directly or through gearing, by a motor 16. A trough 17 is disposed on the entry side of the mill, to which trough billets, designated a, are fed by means of skids 18. An air cylinder 19 is disposed in line with the axis of a billet in the trough, the plunger 20 thereof being employed for pushing the billet into the piercing mill.

On the side of the piercing mill remote from the trough 17 is a receiving table 21 which carries blank-receiving rollers 22 adapted to be positively rotated, when required, by a motor 22a. The table also carries mandrel-supporting rollers, 23 and 23a, which receive the mandrels, designated m, from a conveyor roller table 24 over skids 25. The mandrels are transferred from the roller table 24 to the skids by means of transfer star wheels 26 mounted on a shaft 27 which is adapted to be actuated by a motor 28 whenever it is desired to transfer a mandrel from the roller table over the skids 25 to the rollers 23 and 23a of the receiving table 21.

Figure 5:
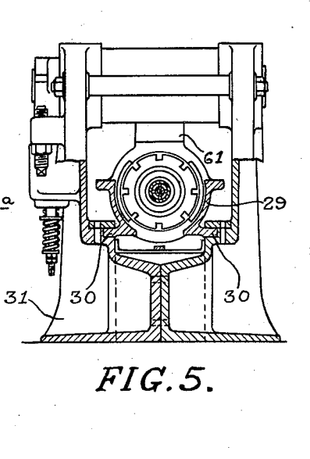
Fig. 5 is a transverse section taken on the broken line V—V of Fig. 4, looking in the direction of the arrows.
Figure 6:
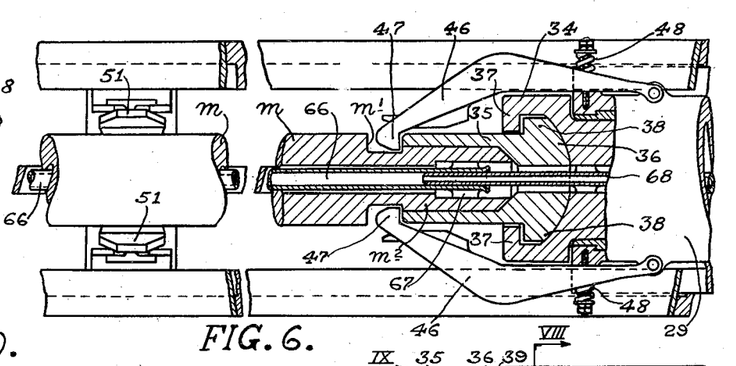
Fig. 6 is a partly sectional broken plan, still further enlarged, of the front part of the mandrel carriage, and of a mandrel secured therein by means of tongs which are provided for the purpose, the mandrel carriage being, however, in a position intermediate of its travel.

Upon a mandrel being fed to the supporting rollers 23 and 23a it is necessary to move it forward so that its point is in the proper position between the cross-rolls for piercing the billet, to provide for the rotation of the mandrel during the piercing operation, and also to support the mandrel against the longitudinal thrust which it will be required to withstand during the piercing operation. To this end a mandrel carriage 29 (Figs. 1 and 2—8) is provided, said carriage being provided with base flanges 30 (Fig. 5) which slide upon suitable tracks formed on a suitable frame 31 which forms a continuation of the receiving table 21. Within the mandrel carriage there is secured a suitable thrust bearing 32 in which is rotatably mounted the bearing portion 33 of a socket 34 for receiving a mandrel-engaging head 35.

In order to give flexibility to the connection between the mandrel and its carriage, the socket 34 is formed with a concave portion for receiving the convex base 36 of the head 35. The front end of the socket is formed with inwardly extending arcuate flanges 37, and the convex base portion 36 of the head 35 is formed with outwardly extending arcuate flanges 38, the dimensions and spacing of the respective flanges being such that the flanges 38 of the head 35 can be passed between flanges 37 of the socket so as to engage behind such flanges when the head is turned through an angle of ninety degrees.

When the mandrel head has thus been inserted in the socket, arcuate key members 39 are inserted in the spaces between the flanges 37 of the socket and the flanges 38 of the head 35 (Fig. 8), and are then secured to the socket. These key members prevent relative rotation between the head 35 and the socket 34, while withdrawal of the head from the socket is prevented by reason of the engagement of the flanges of the head behind those of the socket. Clearance is left between the inside faces of the key members 39, and flanges 37, on the one hand, and the outer surface of the head 35, on the other hand, and also between the front faces of the flanges 38 of the head 35 and the rear faces of the flanges 37 of the socket. From this, and from the curved engagement of the rear end of the base portion 36 of the head 35 with the socket, it will be seen that the mandrel-engaging head can rock through a material angle with respect to the socket, thereby giving flexibility to the joint between the mandrel and its carriage.

Figures 7, 8, 9:
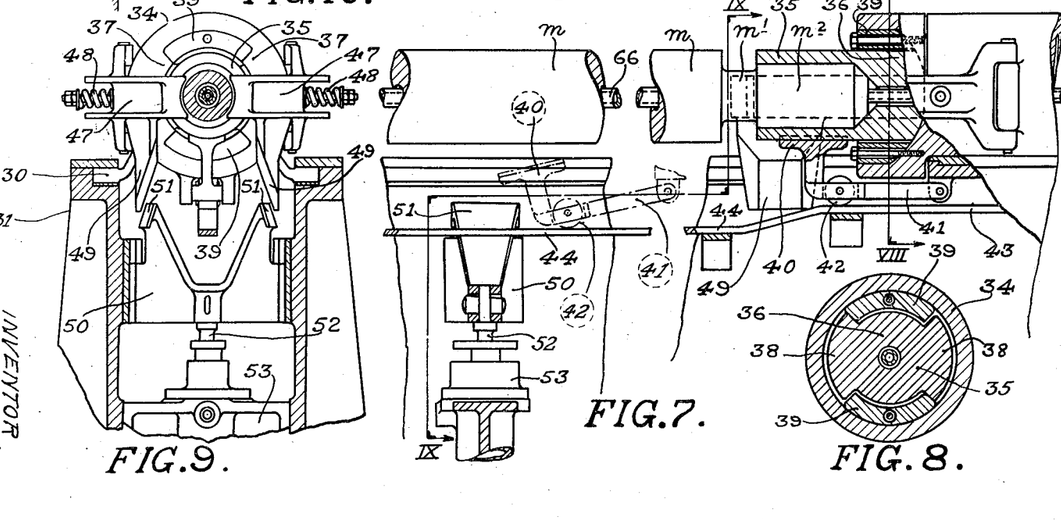
Fig. 7 is an elevation, partly in section, of the parts shown in Fig. 6.
Fig. 8 is a section on the line VIII—VIII of Fig. 7.
Fig. 9 is a section on the line IX—IX of Fig. 7, showing the means for opening the tongs to release the connection between the mandrel and its carriage, such release means being out of operating position.

From the foregoing it will be seen that the mandrel-engaging head 35 would, when there was no mandrel therein, fall somewhat, so as to occupy a downwardly inclined position with respect to the carriage. In order to avoid this, and to maintain the head 35 in alignment with the mandrel when the carriage is being moved towards a mandrel which has been fed to the receiving table 21 and is supported on the rollers 23 and 23a thereof, a shoe 40, for engagement with the head 35, is mounted upon an arm 41 pivoted to the mandrel carriage (Fig. 7). The arm is provided with a roller 42 which runs upon a track carried by the frame 31, such track having an elevated portion 43 at its rear end connected by an inclined portion with a depressed portion 44 at its front end. When the roller 42 is on the elevated portion 43 of the track, the shoe 40 will support the head 35 in alignment with the mandrel, so that the head will telescope over the butt of the mandrel when the carriage is moved up to a mandrel upon the rollers 23 and 23a. However, as the mandrel carriage is moved further forward, to push the mandrel forward to piercing position, the roller 42 will run down the incline and onto the depressed portion 44 of the track. The head 35 will then no longer be supported by the shoe 40, and the required flexible connection between the mandrel and its carriage will obtain.

Each mandrel has a pointed head which may be integral with or detachable from the mandrel and that is adapted to serve as a piercing point. Each mandrel is also provided close to its other, or trailing, end with an annular recess $m'$ and a reduced butt portion $m^2$, the latter being of such diameter as to fit neatly within the head 35. When a mandrel has been fed to the receiving table 21 so as to be supported on the rollers 23 and 23a, the carriage 29 is moved up to the mandrel by means of the piston 45a of an air cylinder 45, whereupon the head 35 engages over the butt portion of the mandrel in the manner just described.

To secure the mandrel against forward movement with respect to the mandrel head,—which the movements being rapid, might occur upon the stoppage of the further forward movement of the carriage to bring the mandrel into piercing position,—tongs 46 are pivoted to the mandrel carriage. These tongs have nose portions 47 adapted to enter the annular recess m' of a mandrel engaged by the carriage, springs 48 being provided which tend to press the tongs into engaging relation with such recess. When the mandrel carriage is brought up to a mandrel lying on the rollers 23 and 23a, so that the head 35 telescopes over the mandrel butt $m^2$ (Fig. 6) the tongs will first be wedged open by the end of the mandrel butt, and will then snap into the recess m' of the mandrel, locking the latter to its carriage.

These connections do not however interfere with the rotation of the mandrel together with the mandrel-engaging head 35 and its connected parts. Rotation of the mandrel during the piercing operation is provided by the head 35, socket 34 and the bearing portion 33 of the latter which engages the thrust bearing 32.

Figure 10:
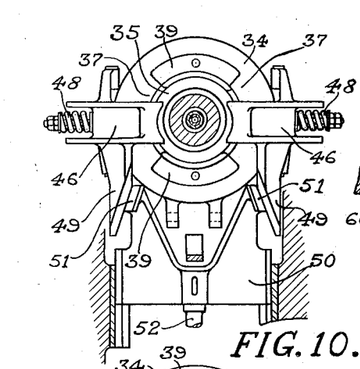
Fig. 10 is a view similar to Fig. 9 but showing the release means in operating position and the tongs as having released the connection between the mandrel and its carriage.

After the piercing operation has been completed, the mandrel carriage is to be disconnected from the mandrel, and means are therefore provided for opening the tongs prior to a retracting movement of the carriage. To that end, the tongs are provided with downwardly extending legs 49 having the inner sides of their end portions inclined upwardly towards each other. A head 50 cooperates with these legs and is provided with upwardly extending wedge portions 51 adapted to enter between the legs and wedge them, and therefore the tongs 46, apart when the head is raised from the position shown in Fig. 9 to the position shown in Fig. 10. The raising of the head is effected by means of the piston rod 52 of an air cylinder or the like 53. The head 50 is placed so that the legs 49 of the tongs will be above it (Fig. 4) when the mandrel is in piercing position. Thus upon the piercing being completed, the head 50 can be raised and the tongs thereby opened, to permit withdrawal of the carriage without affecting the position of the mandrel.

After the mandrel carriage 29 has been moved forward, to effect a connection between it and a mandrel resting on the rollers 23 and 23a in the manner just described, it is moved further forward to push the mandrel forward over the rollers so that its front end passes through the outlet guide 54 of the piercing mill and its point reaches the required position between the cross-rolls 11. The position of the parts will then be that shown in Fig. 21, with the exception that no tubular blank will have yet arrived on the mandrel.

Figures 11, 12, 13, 14:
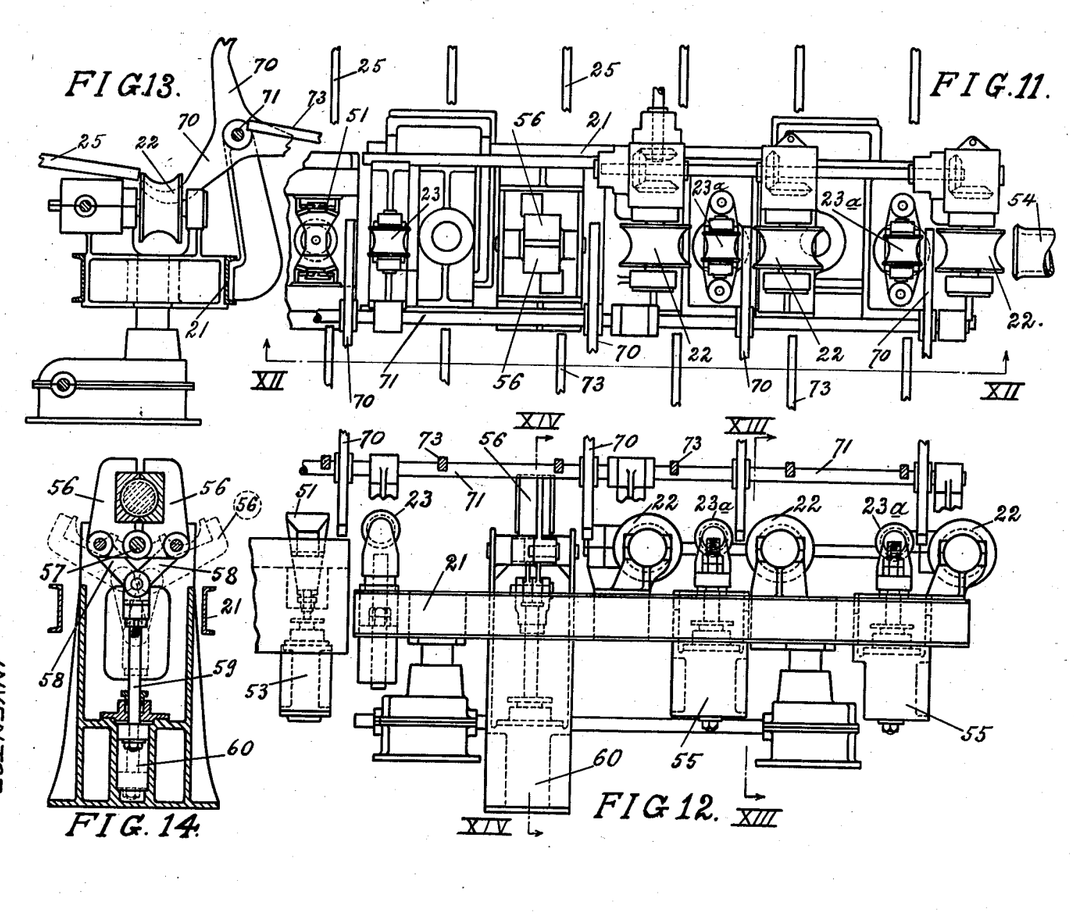
Fig. 11 is an enlarged plan of the receiving table for the piercing mill.
Fig. 12 is a side elevation of the said table as seen from the line XII—XII of Fig. 11.
Figs. 13 and 14 are cross-sections taken on the lines XIII—XIII and XIV—XIV, respectively, of Fig. 12.

Disposed adjacent the position that will be occupied by the trailing end portion of the mandrel when the latter is moved into operative position in the cross-rolls, is a steady-rest for bracing the trailing end of the rapidly rotating mandrel against any tendency to "whip" during the piercing operation. Such steady-rest (Figs. 1, 11, 12, and 14) comprises a pair of jaws 56 pivoted upon a shaft 57 and adapted to be opened or closed, through links 58, by the plunger 59 of an air cylinder or the like 60. During the forward movement of the mandrel the jaws occupy the open position shown in dotted lines in Fig. 14, but after the mandrel has reached its operative position in the cross-rolls, the air cylinder is actuated to close the jaws into the position shown in full lines in Fig. 14 in which they embrace the mandrel with some clearance, and prevent excessive or harmful whipping of the latter. More than one such steady-rest may be employed, especially where relatively long or heavy mandrels are in use.

A latch 61 (Figs. 2-5) secured to a transverse shaft 62 mounted in the frame 31, is provided for engaging an abutment 63 on the mandrel carriage so as to take the thrust which is imparted, through the mandrel, mandrel-receiving head 35, and socket 34, to the thrust bearing 32 contained in the carriage. The latch is adapted to be raised and lowered by means of an arm 64 secured to the shaft 62 and actuated by means of an air cylinder or the like 65. During the forward movement of the carriage, the latch occupies the position shown in dotted lines in Fig. 4. When, however, the mandrel has reached its piercing position, the latch is dropped into the position shown in full lines, where it can take the thrust upon the mandrel which accompanies the piercing operation.

With the mandrel placed in piercing position and supported therein in the manner just described, the ram 20 is actuated to push the billet, a, into the piercing mill, and the billet will be pierced over the mandrel and emerge as a tubular blank from the rolls onto the mandrel into some such position as is shown in Fig. 21. The tubular blank, designated a' telescoped on the mandrel, will then rest upon the rollers 22 of the receiving table. Since the mandrel-supporting rollers, 23a, at the end of the receiving table adjacent the piercing mill must in order to support the mandrel in proper position be higher than the blank-receiving rollers 22, by an amount which depends upon the wall thickness of the blank, these mandrel-supporting rollers 23a would, if they remained in operative position, stand in the way of the issuing blank.

Accordingly, the rollers 23a are carried by heads which are adapted for vertical movement by means of air cylinders or the like 55. As the tubular blank emerges from the cross-rolls, the operator depresses first one then the second of the rollers 23a, thereby getting them out of the way of the issuing blank. Or the air cylinders, may, of course, be made to operate automatically, on the actuation by the blank of flag switches or the like, in a manner which is well understood in this art.

When the billet has thus been pierced and the resulting tubular blank is resting upon the rollers 22 of the receiving table, the air cylinder 53 is actuated to cause the head 50 to rise and the wedge portions thereof to open the tongs 47. In addition, the air cylinder 65 is actuated to raise the latch 61 out of the way of the mandrel carriage, whereupon the latter can be retracted without affecting the blank and mandrel, which remain resting upon the rollers 22 and 23, respectively. The blank-receiving rollers 22 are now rotated so as to withdraw the blank, and the mandrel contained therein, from the piercing mill to such a position that the front ends of the blank and mandrel are free of the mill and in such position that the blank with the mandrel therein can be removed transversely from the receiving table 21.

In some cases it may be found desirable to retract the mandrel out of the piercing mill positively instead of relying upon the mandrel being moved by the tubular blank when the latter is retracted through the agency of the driven blank-receiving rollers 22. To provide for this, a second head, 50a, which may be identical with the head 50, is placed to the rear of the last-named head (Fig. 4) and in such position that it will be in position to cooperate with the tongs when the mandrel carriage has nearly reached the limit of its retracting movement.

When, therefore, the head 50a is used in place of the head 50, the mandrel carriage, through the tongs, will draw the mandrel backward out of the piercing mill, in which case the operator will control the rearward movement of the mandrel with relation to that of the pierced blank. When the mandrel carriage has nearly reached its extreme rear position, the cylinder 53a for the head 50a is actuated to release the tongs, allowing the mandrel carriage to complete its rearward movement alone. The wedge portions 51a of the head 50a are tapered towards each other at the front and rear, as will be seen from the similarly shaped wedge portions 51 of the head 50, shown in Figs. 6, 7, 9, and 10.

Therefore, for automatic action, the head 50a may be left in its raised position. Then the legs 49 of the tongs will be automatically wedged apart when the legs come into contact with the wedge portions 51a, just before the end of the rearward movement of the mandrel carriage, releasing the mandrel and allowing the carriage to complete its rearward movement by itself. In such case the rotation of the rollers 22 would be stopped in proper time, with respect to the opening of the tongs, as by a flag switch or the like.

In some cases it may be desirable to cool the mandrel during the piercing operation,—for instance, in order that it may not start, in an unduly heated condition, upon the subsequent operation of elongating, wherein considerable further heating would occur. Each mandrel, therefore is made hollow and has provided therein a pipe 66 of smaller exterior diameter than the bore of the mandrel, which bore is enlarged at the butt of the mandrel to provide room for spacing wings 67 (Figs. 4 and 6) which extend transversely from the end of the pipe 66 and serve to maintain the rear end of the pipe centrally in the mandrel. The socket 34 is likewise made hollow to receive a pipe 68 having spacing wings for maintaining it central in the bore of the socket, and the end of which extends through a central opening in the bore of the head 35.

Water is supplied to the pipe 68 through a flexible hose 69. The pipe 68 is of smaller diameter than the pipe 66 so that its front end will telescope into the rear end of the latter when the mandrel carriage is brought forward so as to make engagement, in the manner above described, with a mandrel which has arrived upon the rollers 23, 23a. During the piercing operation water for cooling the mandrel is admitted to the pipe 68 and flows therethrough, and through the pipe 66, to the closed front end of the mandrel, returning through the space surrounding the pipes 66 and 68 in the bores of the mandrel and socket, respectively, and finding its exit at the rear end of the mandrel carriage.

From the foregoing it will be seen that the piercing operation is conducted in such manner that after the piercing has been completed the pierced billet, or tubular blank a', and the mandrel contained therein, are left upon the receiving table 21 in such position that the way is unobstructed for their removal, in their assembled condition, from the receiving table. Such removal is effected by means of star wheels 70 (Figs. 1, 11, and 13), mounted upon a shaft 71 adapted to be rotated through one-third of a revolution, when required, by a motor 72.

Each star wheel has three arms so proportioned and arranged that upon each rotation of the star wheels through one-third revolution a blank and contained mandrel will be raised from the rollers 22 and 23 and deposited upon skids 73, down which they roll, as indicated in Fig. 1, to the feed table 74 for the elongating mill. The latter may be of the character described in Patent No. 1,870,209 granted to Samuel E. Diescher August 2, 1932, and would then include cross-rolls 75 driven through shafts 76 and reduction gearing 77 from a motor 78, and guide discs 79, one of which is shown by dotted lines in Figs. 1 and 1a, and which are driven by a motor 80 through a gear stand 80a.

The feed table 74 has mounted therein rollers 81 upon which the tubular blank a', with its contained mandrel, are received, and over which the blank and mandrel are fed through a guide 82 into the elongating mill. It will be appreciated that, after the piercing operation and the transfer of the blank and mandrel over the skids 73 to the feed table 74, the blank may occupy various positions with respect to the mandrel which it contains. In order that the length of the mandrel may be kept down to the lowest limit practicable, however, it is desirable that the blank have a determined position with respect to the mandrel at the time when the blank enters the cross-rolls of the elongating mill.

Usually this position is such that the leading end of the mandrel projects slightly beyond the leading end of the blank. To this end, a pusher device is provided for feeding the blank and mandrel into the elongating mill, such device having portions for engaging both the trailing end of the blank and the trailing end of the mandrel, such portions being spaced apart by a distance which is equal to the distance by which it is desired that the trailing end of the mandrel shall protrude beyond the trailing end of the blank.

The pusher device is here shown (in Figs. 15 to 20) as constituted by a tubular pusher 83 of an interior diameter large enough to pass over the mandrel, so that the leading end of the pusher can engage the trailing end of the tubular blank. The pusher has adjustably mounted therein in abutment 84 which is so placed, by the adjustment, that it is spaced from the front end of the pusher by a distance equal to that by which it is desired that the mandrel shall protrude rearwardly from the blank. The pusher is mounted upon rollers 85 with its leading end between pinch rolls 86 adapted to be driven, in one direction or the other as desired, by a motor 87.

At the front end of the feed table 74 are disposed a blank stop 88 and a mandrel stop 89, the stops being suitably spaced and being vertically movable into and out of the path of the blank and mandrel, respectively, by a bell-crank lever 90, actuated at will by means of an air cylinder 91. Towards the end of the feed table adjacent the elongating mill there is provided a trough 92 along which the blanks are fed into the mill and which is provided with a hinged cover 93 which is swung upwardly (Fig. 1) at the time when a blank and mandrel are received from the skids 73, but can be swung downwardly, above the blank, when the latter is to be fed forward into the elongating mill.

The cover serves to prevent whipping of the trailing end of the blank during the elongating operation. The cover 93 may also serve as a clamp for holding the blank while the mandrel is being pushed therethrough to project beyond the forward end thereof a distance in excess of that provided for by the stops 88 and 89. If the tubular blanks are short, as in making short tubes, it is well to position the mandrels in balanced relation therein by passing a greater portion through the blanks before elongation commences. At times the forwardly projecting portion may be several feet longer than that provided by the stops 88 and 89. In the production of tubes with thin walls, the mandrels should project forward sufficiently that an undue length of a thin wall tube will not be unsupported by the mandrel therein.

Figure 15:
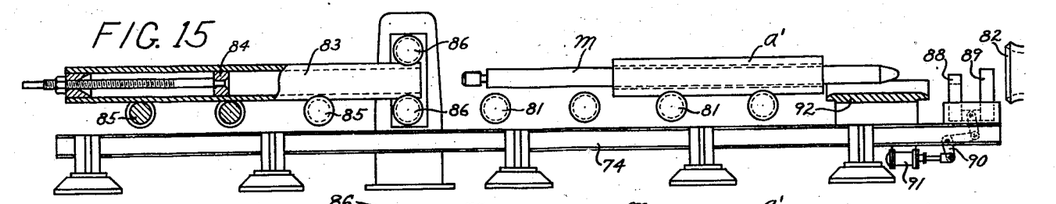
Fig. 15 is an enlarged side elevation of the feed-table for the elongating mill, showing a pierced billet, or tubular blank, and enclosed mandrel as having arrived thereon after the piercing operation.
Figures 16, 17:
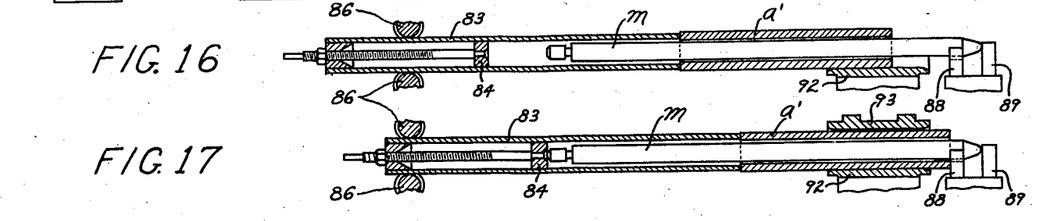
Figs. 16 and 17 are views showing successive steps in feeding towards the elongating mill the tubular blank and mandrel shown in Fig. 15.

Fig. 15 shows a tubular blank as having arrived on the feed table 74 with the mandrel therein projecting too far beyond the front end thereof. In such a case, when the pusher 83 is moved forward, its leading end will engage the trailing end of the blank and move the blank and contained mandrel forward until the leading end of the mandrel comes into engagement with the mandrel stop 89 (Fig. 16) and can move no further. Thereafter the blank will be pushed forward along the mandrel until its leading end comes into engagement with the blank stop 88 (Fig. 17) by which time the abutment 84 of the pusher will have come into contact with the trailing end of the mandrel.

Figure 18:
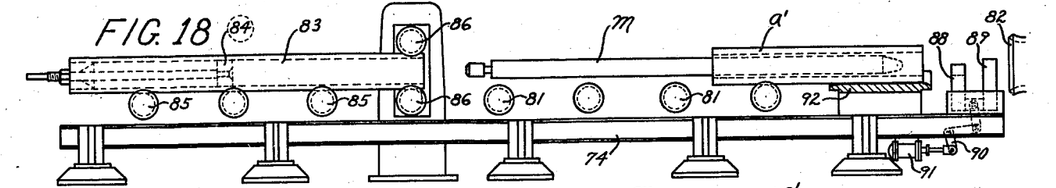
Fig. 18 is a view similar to Fig. 15, but showing the tubular blank and mandrel as having arrived on the feed table in a position, with relation to each other, different from that shown in Fig. 15.
Figure 19:
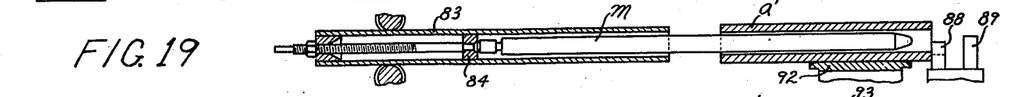
Figs. 19 and 20 are views showing the successive steps in feeding forward the tubular blank and mandrel shown in Fig. 18.

At this stage the stops 88 and 89 are lowered, and the pusher will move the blank and mandrel together, in the correct predetermined relative position, into the cross-rolls of the elongating mill. In Fig. 18, the blank and mandrel are shown as having arrived upon the feed table 74 with the leading end of the mandrel positioned too far backward and to the rear of the leading end of the blank. In such a case, upon forward movement of the feed pusher the abutment 84 thereof will engage the trailing end of the mandrel and will push the mandrel, and the tubular blank surrounding it, forward until the leading end of the blank comes into engagement with the blank stop 88 (Fig. 19).

Figure 20:
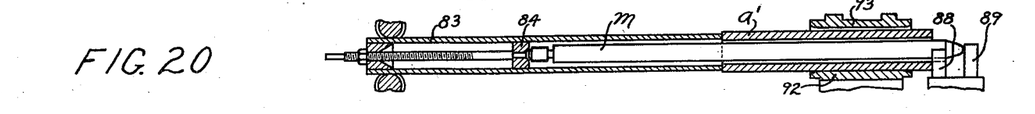

Thereafter the mandrel will be pushed forward, relatively to the blank, until its leading end comes into engagement with the mandrel stop 89 (Fig. 20). As in the previous instance, the mandrel and blank are then in the correct relative positions for being fed forward to the elongating mill, except that, as explained above, special circumstances may require that the mandrel project forwardly in excess of the amount provided by the stops 88 and 89.

Beyond the elongating mill is a delivery table (Fig. 1a) having thereon rollers 124, driven through reduction gearing 125 by a motor 126, and beyond the delivery table is a receiving table having rollers 94, driven by a motor 95, upon which the completed tube and the mandrels contained therein are received.

Extending laterally from the receiving table are skids 96 which direct the tubes and mandrels to an extractor table 97, the tubes and mandrels being transferred from the receiving table to the skids by means of transfer star wheels 98 carried by a shaft 99 adapted to be operated, when required, by a motor 100. The extractor table is provided with rollers 101 adapted to be driven, when required, by a motor 102. When so driven, these rollers move the tube and mandrel lengthwise until the tube is arrested by a stop 103 having therein a notch or hole 103a large enough to pass the mandrel but too small to permit passage of the tube. That end of the mandrel which was originally the trailing end, which still projects beyond the end of the completed tube, is thus introduced between pinch rolls 104, which serve to draw the mandrel out from the tube and deliver it onto a mandrel-receiving table 105. The rollers 106 of the latter are driven, and move the mandrel longitudinally until it is brought to rest by the engagement of its end with a stop 107 disposed at the end of the table.

The mandrel rolls from the mandrel-receiving table 105 to the mandrel-return table 108 over skids 109, the mandrel being transferred to the skids by means of star wheels 110 mounted on a shaft 128 actuated by a motor 111. The various transfers of the tube and mandrel subsequent to the elongating operation have placed the mandrel at a level lower than that of the skids 73 over which the pierced blanks and mandrels are transferred to the feed table of the elongating mill, so that the mandrel-return table 108 can extend beneath the skids 73 (Fig. 1) to a mandrel storage rack comprising skids 112. The rollers 113 of the mandrel-return table 108 are driven by motors 114 and 114a, and move the mandrel longitudinally until it is brought to rest with its end in engagement with a stop 126 at the end of the table.

The mandrel is then transferred to the skids of the mandrel storage rack by star wheels 115 mounted upon a shaft 116, driven, when required, by a motor 117. The ends of the skids 112, constituting the mandrel storage rack, remote from the mandrel-return table 108, are adjacent the mandrel feed roller table 24 so that the mandrels as received from the return table 108 can be taken from the storage rack and fed forward again by the roller table for circulation again through the apparatus. A sufficient number of mandrels are kept upon the storage rack 112 to give time for suitably cooling each mandrel before it is again put in use.

After the mandrel has been withdrawn from a tube, at the mandrel extraction table 97, the tube is transferred to skids 118 (Fig. 1a), by means of star wheels 119 mounted on a shaft 120 driven when desired by a motor 121. The tubes roll down the skids 118 and onto the rollers 122 of a delivery table 123. These rollers are positively driven by a motor 129 and deliver the tubes to suitable storage or cooling means.

One of the important advantages of my improved method, and the apparatus of my invention for practicing it, is that the expenditure of time involved in the withdrawing of the piercing mandrel from the pierced blank and the introduction of another mandrel into the blank for the elongating operation is eliminated. By my invention, the pierced blank can be transferred to the elongating mill, and the elongation started, practically immediately upon the completion of the piercing operation, while at the same time a new piercing operation is being started. The result is a very important increase of production speed.

I claim:

1. Apparatus for making seamless tubes from heated billets by employing a single mandrel therefor, comprising a cross-roll mill for piercing a billet with a mandrel in alignment therewith to cause the tubular blank thus formed to telescopically enclose the mandrel, and a cross-roll mill for elongating said tubular blank on the same heat thereof and while on said mandrel.

2. The method of making seamless tubes from billets by employing a single mandrel therefor, which comprises cross-rolling a heated billet in alignment with a mandrel to pierce the billet and cause the tubular blank thus formed to telescopically enclose the mandrel, and then on the same heat thereof cross-rolling said tubular blank on said mandrel to elongate the blank.

3. The method of making seamless, tubes which includes subjecting a heated billet to the action of cross-rolls and a pointed mandrel to produce a tubular blank containing the mandrel, and subjecting said blank on the same heat thereof while containing said mandrel to the action of further cross-rolls, to elongate said blank on said mandrel.

4. The method of making seamless tubes, which includes the steps of introducing to a cross-roll piercing mill a mandrel having end-thrust resisting means associated therewith, feeding a heated billet to said mill to cause it to emerge as a tubular blank upon said mandrel, disassociating said mandrel and resisting means while said mandrel is contained in said blank, transferring said blank with said mandrel contained therein to a cross-roll elongating mill, and subjecting said blank on the same heat thereof to the action of said elongating mill.

5. The method of making seamless tubes, which includes introducing to a cross-roll piercing mill a mandrel of a length sufficient for the elongating operation, feeding a heated billet to said mill to cause it to emerge as a tubular blank upon said mandrel, transferring said blank and contained mandrel to a cross-roll elongating mill, and elongating said blank on the same heat thereof and while on said mandrel.

6. Tube-making apparatus, comprising a cross-roll mill for piercing a heated billet over a mandrel to form a tubular blank, a support for receiving the tubular blank and contained mandrel from said mill, means for withdrawing the tubular blank and contained mandrel onto said support from said mill into a position for lateral discharge, a cross-roll elongating mill disposed to receive and elongate said blank on the same heat and while on said mandrel, a support at the entry side of said elongating mill for receiving said tubular blank and contained mandrel to be fed thereto, and means for discharging tubular blanks and contained mandrels laterally from said first-named support and transferring the same to said second-named support.

7. Tube-making apparatus, comprising a cross-roll mill for piercing a heated billet over a mandrel whereby the billet emerges from the mill as a tubular blank threaded upon the mandrel, a cross-roll elongating mill disposed to receive and elongate said blank on the same heat and while on said mandrel, means at the entry side of said elongating mill for supporting said tubular blank and contained mandrel to be fed thereto, and means for transferring tubular blanks with contained mandrels from said piercing mill to said supporting means.

8. Tube-making apparatus, comprising a cross-roll mill for piercing a heated billet over a mandrel to form a tubular blank, means for feeding mandrels to said mill, a cross-roll elongating mill, means for transferring tubular blanks with contained mandrels from said piercing mill to said elongating mill and for entering the blanks on the same heat thereof and on the mandrels to the latter mill to produce elongated tubes containing mandrels, means for extracting the mandrels from the elongated tubes, and means for returning the mandrels to said mandrel-feeding means.

9. Tube-making apparatus, comprising a cross-roll mill for piercing a heated billet over a mandrel to form a tubular blank, means at the exit side of said mill for feeding a mandrel to the mill and supporting said mandrel during the piercing operation, a cross-roll elongating mill disposed to receive and elongate said blank on the same heat and while on said mandrel, a support at the entry side of said elongating mill for receiving the tubular blanks and contained mandrels to be fed to the mill, and means for transferring the tubular blanks with contained mandrels from said piercing mill to said elongating mill.

10. Tube-making apparatus, comprising a cross-roll mill for piercing a heated billet over a mandrel to form a tubular blank, supporting means for receiving the tubular blank and contained mandrel from said mill, means for moving the tubular blank and contained mandrel into a position for lateral discharge, a cross-roll elongating mill disposed to receive and elongate said blank on the same heat and while on said mandrel, a support at the entry side of said elongating mill for receiving the blank and contained mandrel to be fed thereto, and means for discharging a tubular blank and contained mandrel laterally from the receiving means and transferring them to said support.

11. Tube-making apparatus, comprising a cross-roll mill for piercing a heated billet over a mandrel to form a tubular blank, rollers for receiving the tubular blank and contained mandrel from said mill, means for rotating said rollers to withdraw the tubular blank and contained mandrel from said mill into a position for lateral discharge, a cross-roll elongating mill disposed to receive and elongate said blank on the same heat and while on said mandrel, a support at the entry side of said elongating mill for receiving said blank and contained mandrel to be fed thereto, and means for discharging a tubular blank and contained mandrel laterally from said rollers and transferring the same to said support.

12. Tube-making apparatus, comprising a cross-roll mill for piercing a heated billet over a mandrel to form a tubular blank, supporting means for receiving the tubular blank and contained mandrel from said mill, a thrust-resisting member provided with means for gripping the rear end of a mandrel and movable toward and from the mill to position the mandrel before the piercing operation and to withdraw the mandrel and the tubular blank telescoped thereon from the mill into a position for lateral discharge, a cross-roll elongating mill disposed to receive and elongate said blank on the same heat and while on said mandrel, a support at the entry side of said elongating mill for receiving the blank and contained mandrel to be fed thereto, and means for discharging a tubular blank and contained mandrel laterally from the receiving means and transferring them to said support.

13. In a cross-roll mill tube-making apparatus, a mandrel carriage mounted for reciprocation towards and from said mill and having a movably mounted head for engaging a mandrel, and supporting means for said head that is in supporting position when said carriage is in a retracted position and is withdrawn from supporting position when the carriage is in an advanced position.

14. In a cross-roll mill tube-making apparatus, a mandrel carriage mounted for reciprocation towards and from said mill and having a mandrel-engaging head movably mounted thereon, a track having portions of upper and lower levels, and a member pivotally connected to said head and coacting with said track for supporting said head in a horizontal position when said member is on the upper level of said track and for releasing said head for movement, effected by said mill, with respect to said carriage when said member is on the lower level of said track.

15. In a cross-roll mill tube-making apparatus, a mandrel carriage having gripping members biased to gripping positions for engaging a mandrel to secure it to said carriage at the delivery side of said mill, and mandrel releasing means for disengaging said members comprising a device movable transversely thereto for moving said members outwardly from the mandrel subsequent to a cross-rolling operation of said mill.

16. In a cross-roll mill tube-making apparatus, a mandrel carriage having movable arms for engaging a mandrel to secure it to said carriage at the delivery side of said mill, and releasing means for said arms comprising a cam device for moving said arms outwardly to disengage them from the mandrel subsequent to a cross-rolling operation of said mill.

17. In a cross-roll billet-piercing mill of the type in which the pierced billet is fed over an aligned mandrel at the delivery side of the mill, a reciprocable mandrel carriage, means for moving the carriage to engage the rear end of the mandrel and to advance the mandrel to position the end thereof in the mill and to retract the carriage from the mill, said carriage having gripping members biased to gripping positions for engaging a mandrel to secure it to said carriage, and means for disengaging said members to release said mandrel, said means comprising a device movable transversely of said mandrel for moving said members outwardly therefrom.

18. In a cross-roll billet-piercing mill of the type in which the pierced billet is fed over an aligned mandrel at the delivery side of the mill, a reciprocable mandrel carriage, means for moving the carriage to engage the rear end of the mandrel and to advance the mandrel to position the end thereof in the mill and to retract the carriage from the mill, said carriage having movable arms for engaging a mandrel to secure it to said carriage, and releasing means for said arms comprising a cam device for moving said arms outwardly from the mandrel to release the latter.

19. In a cross-roll billet-piercing mill of the type in which the pierced billet is fed over an aligned mandrel at the delivery side of the mill, a reciprocable mandrel carriage, means for moving the carriage to engage the rear end of the mandrel and to advance the mandrel to position the end thereof in the mill and to retract the carriage from the mill, said carriage having means for releasably engaging a mandrel to secure it to said carriage, and means for effecting the release of said mandrel from the carriage before the latter is retracted from the mill.

20. In a cross-roll billet-piercing mill of the type in which the pierced billet is fed over an aligned mandrel at the delivery side of the mill, a reciprocable mandrel carriage, means for moving the carriage to engage the rear end of the mandrel and to advance the mandrel to position the end thereof in the mill and to retract the carriage from the mill, said carriage having means for releasably engaging a mandrel to secure it to said carriage, and means for effecting the release of said mandrel from the carriage after the mandrel and the blank thereon have been moved away from the mill by the carriage.

21. Tube-making apparatus, comprising a mill, a feed-table for supplying heated tubular blanks and mandrels contained therein to said mill, means for supplying heated blanks and contained mandrels to said feed-table, means for advancing the position of the mandrel in each blank when it is on the feed-table, and means comprising a hinged cover above a portion of said feed-table for retaining the blank in stationary position while the position of the mandrel is advanced to project beyond the blank.

22. In a cross-roll mill tube-making apparatus, a carriage for supporting one end of a mandrel therein while permitting rotation of said mandrel by the action of said mill, said carriage being mounted for reciprocation towards and from said mill to control the longitudinal position of said mandrel with relation to the mill, and means for actuating said carriage.

23. In a cross-roll mill tube-making apparatus, a carriage having a rotatable head therein for engaging a mandrel and for resisting end thrust of said mandrel imparted by said mill, said carriage being reciprocable towards and from said mill longitudinally of said mandrel, and means for reciprocating said carriage.

24. Tube-making apparatus, comprising a cross-roll mill for piercing heated billets over a pointed mandrel, a cross-roll elongating mill, means for transferring pierced billets and contained mandrels from the piercing mill to the elongating mill for passage therethrough on the same heat of the pierced billets, means for separating the mandrels from the tubes thus produced and for returning the used mandrels to the piercing mill for successive positioning in alignment with the pass thereof, and means comprising a thrust-resisting member for advancing a positioned mandrel into the piercing mill to position the point of the mandrel for a piercing operation.

25. Tube-making apparatus, comprising a cross-roll mill for piercing heated billets over a pointed mandrel, a cross-roll elongating mill, means for transferring pierced billets and contained mandrels from the piercing mill to the elongating mill for passage therethrough on the same heat of the pierced billets, means for separating the mandrels from the tubes thus produced and for returning the used mandrels to the piercing mill, means for positioning said mandrels successively in alignment with the pass of the piercing mill, and means comprising a mandrel carriage having a thrust-resisting member for engaging a mandrel thus positioned and moving it toward the piercing mill to position the point thereof between the rolls of the mill.

26. The method of making seamless tubes which comprises passing a heated billet through a cross-roll piercing mill and onto a mandrel and then on the same heat without removing said mandrel passing the resultant tube and mandrel through a cross-roll elongating mill.

27. In a cross-roll piercing mill, a mandrel for receiving a tube produced by said mill as it emerges therefrom, a movable carriage for feeding to and retracting said mandrel from said mill, means for releasably and rotatably supporting the outer end of the mandrel while the other end is engaged between the mill rolls, means for releasably engaging the tube as it is discharged from the mill to limit the wobbling thereof, and means for disconnecting the mandrel from said carriage.

AUGUST P. DIESCHER.